(12) United States Patent
Jeong

(10) Patent No.: US 10,191,314 B2
(45) Date of Patent: Jan. 29, 2019

(54) DISPLAY APPARATUS

(71) Applicant: Samsung Display Co., LTD., Yongin-si, Gyeonggi-Do (KR)

(72) Inventor: Seongkoo Jeong, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 310 days.

(21) Appl. No.: 14/952,353

(22) Filed: Nov. 25, 2015

(65) Prior Publication Data

US 2016/0266434 A1 Sep. 15, 2016

(30) Foreign Application Priority Data

Mar. 11, 2015 (KR) .................. 10-2015-0033979

(51) Int. Cl.
*G09F 13/08* (2006.01)
*G02F 1/1333* (2006.01)
*G02F 1/1335* (2006.01)

(52) U.S. Cl.
CPC .. *G02F 1/133308* (2013.01); *G02F 1/133615* (2013.01); *G02F 2001/133314* (2013.01); *G02F 2001/133317* (2013.01)

(58) Field of Classification Search
CPC ... G02F 1/133308; G02F 2001/133314; G02F 1/133615; G02F 2001/133317
USPC ....................... 362/31–634, 97.02
See application file for complete search history.

(56) References Cited

U.S. PATENT DOCUMENTS

| 8,040,455 B2 | 10/2011 | Won et al. | |
| 2008/0144337 A1* | 6/2008 | Li | G02B 6/0088 |
| | | | 362/633 |
| 2010/0067185 A1* | 3/2010 | Liou | F16M 13/02 |
| | | | 361/679.21 |
| 2010/0277664 A1* | 11/2010 | Kim | G02B 6/0085 |
| | | | 349/58 |
| 2010/0321606 A1* | 12/2010 | Liou | G06F 1/1601 |
| | | | 349/60 |
| 2014/0153213 A1 | 6/2014 | Oh et al. | |
| 2014/0218845 A1 | 8/2014 | Peng et al. | |
| 2014/0241010 A1 | 8/2014 | Lee et al. | |

FOREIGN PATENT DOCUMENTS

| KR | 1020060018526 A | 3/2006 |
| KR | 1020080004086 A | 1/2008 |
| KR | 1020080045380 A | 5/2008 |
| KR | 1020080065143 A | 7/2008 |

* cited by examiner

*Primary Examiner* — Evan Dzierzynski
*Assistant Examiner* — Omar Rojas Cadima
(74) *Attorney, Agent, or Firm* — Cantor Colburn LLP

(57) ABSTRACT

A display apparatus includes a display panel, a backlight unit, and an accommodation member for accommodating the display panel and the backlight unit. The accommodation member includes a bottom part defining a bottom surface of the accommodation member, and a plurality of side surface parts which is connected to the bottom part and defines side surfaces of the accommodation member, in which a position where the side surface parts are connected to the bottom part varies based on sizes of the display panel and the backlight unit.

20 Claims, 14 Drawing Sheets

DISPLAY APPARATUS

This application claims priority to Korean Patent Application No. 10-2015-0033979, filed on Mar. 11, 2015, and all the benefits accruing therefrom under 35 U.S.C. § 119, the content of which in its entirety is herein incorporated by reference.

BACKGROUND

1. Field

The disclosure herein relates to a display apparatus, and more particularly, to a display apparatus capable of reducing a manufacturing cost.

2. Description of the Related Art

In general, a display apparatus includes a display panel for displaying an image and a backlight unit for providing light to the display panel. The display panel adjusts transmittance of the light provided from the backlight unit to display an image.

The backlight unit may be classified into an edge type backlight unit disposed on a side surface of the display panel to provide light to the display panel and a direct type backlight unit disposed under the display panel to provide light to the display panel. The edge type backlight unit typically includes a light source for generating light and a light guide plate for guiding a traveling direction of the light. The light source may be disposed on a side of the light guide plate, and the light guide plate may guide the light generated from the light source to the display panel.

The backlight unit and the display panel may be accommodated between a bottom chassis and a top chassis and then be fixed. The bottom chassis and top chassis may protect the backlight unit and the display panel.

SUMMARY

The disclosure relates to a display apparatus capable of reducing a manufacturing cost.

Embodiments of the invention provide a display apparatus including a display panel, a backlight unit, and an accommodation member which accommodates the display panel and the backlight unit, where the accommodation member includes a bottom part defining a bottom surface of the accommodation member, and a plurality of side surface parts which is connected to the bottom part and defines side surfaces of the accommodation member, and a position where the side surface parts are connected to the bottom part varies based on sizes of the display panel and the backlight unit.

In some embodiments, the bottom part may have long sides in a first direction and short sides in a second direction crossing to the first direction, and the side surface parts may include a plurality of first side surface parts corresponding to the long sides of the bottom part; and a plurality of second side surface parts corresponding to the short sides of the bottom part.

In other embodiments, each of the first side surface parts may include a first vertical part extending upward with respect to the bottom part, and a first horizontal part extending horizontally with respect to the bottom part and connected to a lower portion of the first vertical part, and each of the second side surface parts may include a second vertical part extending upward with respect to the bottom part, and a first horizontal part extending horizontally with respect to the bottom part and connected a lower portion of the first vertical part.

In still other embodiments, the first vertical part may have substantially the same length as each of the long sides of the bottom part in the first direction, and the second vertical part may have substantially the same length as each of the short sides of the bottom part in the second direction.

In even other embodiments, a side of the first horizontal part, which is connected to a lower portion of the first vertical part, may have a length greater than a length of an opposing side of the first horizontal part, and a side of the second horizontal part, which is connected to a lower portion of the second vertical part, may have a length greater than a length of an opposing side of the second horizontal part.

In yet other embodiments, the bottom part may include a central area defined by a predetermined area of a central part of the bottom part; and an edge area surrounding the central area. In such embodiment, the first and second horizontal parts may be variably connected to the edge area based on the sizes of the display panel and the backlight unit.

In further embodiments, a plurality of bottom holes may be defined at the edge area of the bottom part, a plurality of first side surface holes may be defined in the first horizontal part, a plurality of second side surface holes may be defined in the second horizontal part, and the first and second side surface holes may be aligned with a portions of the bottom holes, which is determined based on the sizes of the display panel and the backlight unit.

In still further embodiments, the bottom holes may include a plurality of first bottom holes disposed at opposing sides of the edge area of the bottom part in the second direction, respectively, where the first bottom holes may be disposed in a matrix form having a plurality of rows in the first direction, and a plurality of second bottom holes disposed at opposing sides of the edge area of the bottom part in the first direction, respectively, where the second bottom holes may be disposed in a matrix form having a plurality of rows in the second direction.

In even further embodiments, the first side surface holes may be disposed on the first bottom holes disposed in a same row of the first bottom holes, and the same row of the first bottom holes is determined based on the sizes of the display panel and the backlight unit.

In yet further embodiments, the second side surface holes may be disposed on the second bottom holes disposed in a same row of the second bottom holes, and the same row of the second bottom holes is determined based on the sizes of the display panel and the backlight unit.

In much further embodiments, the second side surface holes may be disposed on the second bottom holes disposed in a same row of the second bottom holes, and the same row of the second bottom holes may correspond to the same row of the first bottom holes.

In still further embodiment, the display apparatus may further include a connection member which connects the bottom part to the first and second horizontal parts, where the connection member may be inserted into the first bottom holes in the same row and the first side surface holes disposed thereon, and inserted into the second bottom holes in the same row and the second side surface holes disposed thereon. In such embodiment, the connection member may include a nail or screw In even further embodiment, the first and second horizontal parts may be disposed on a lower portion of the bottom part to allow top surfaces of the first and second horizontal parts to contact with a bottom surface of the bottom part.

In yet further embodiment, the first and second horizontal parts may be disposed on the bottom part to allow bottom surfaces of the first and second horizontal parts to contact with a top surface of the bottom part.

In still further embodiments, the first horizontal part may be disposed on one of the top and bottom surfaces of the bottom part, and the second horizontal part may be disposed on one of the top and bottom surfaces of the bottom part.

In still further embodiments, the display apparatus may further include a reinforcing member having a plate shape and disposed on the accommodation member.

In still further embodiments, the display apparatus may further include a mold frame having a frame shape and disposed adjacent to inner side surfaces of the first and second vertical parts.

In even further embodiments, the mold frame may have a stair shape when viewed from a cross-sectional view.

In even further embodiments, the display apparatus may further include a cover member having a frame shape and disposed on the display panel.

BRIEF DESCRIPTION OF THE DRAWINGS

The above and other features of the present disclosure will become readily apparent by reference to the following detailed description when considered in conjunction with the accompanying drawings, in which.

DETAILED DESCRIPTION

Figure 1:
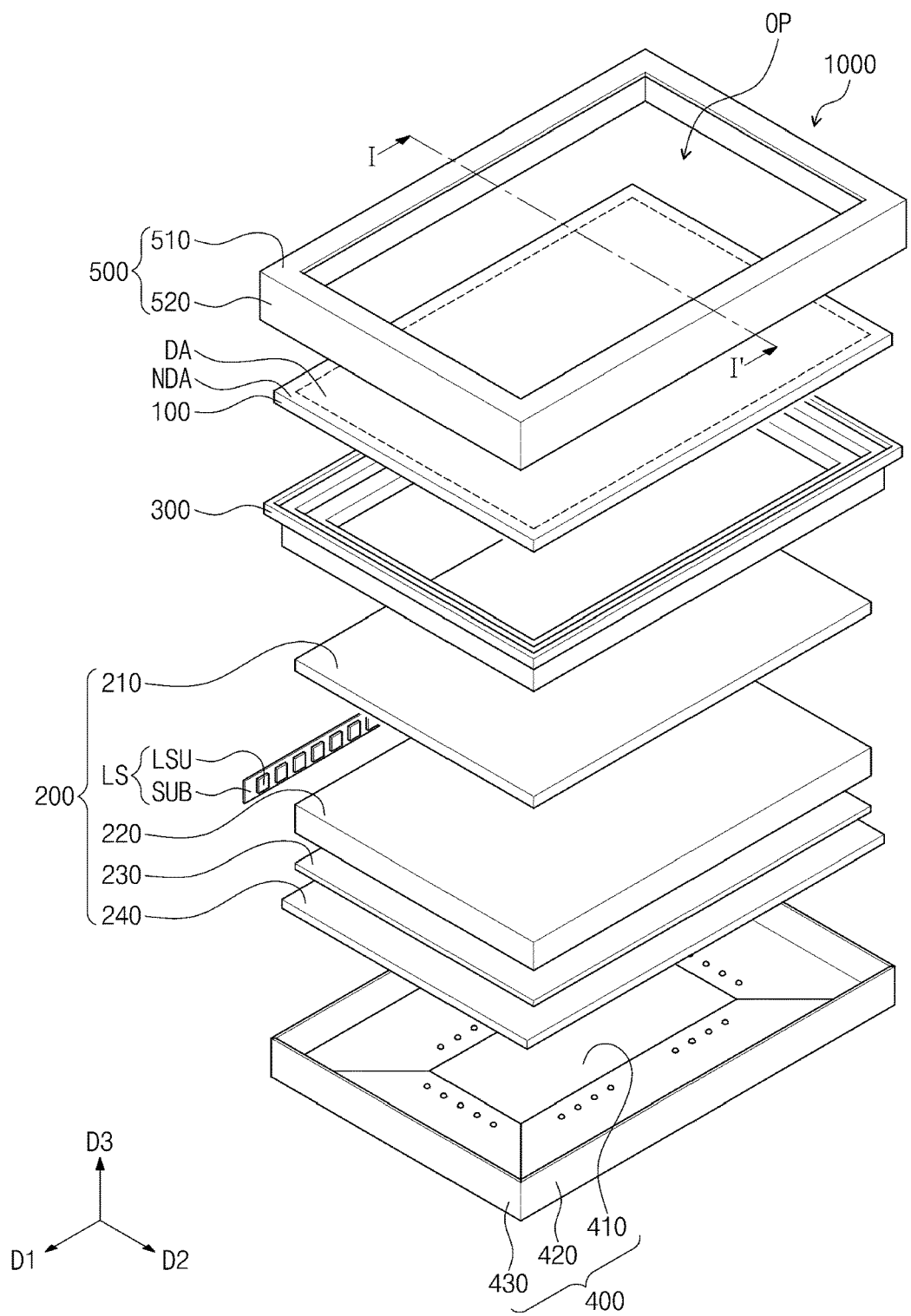
FIG. 1 is an exploded perspective view of an exemplary embodiment of a display apparatus according to the invention.

The invention now will be described more fully hereinafter with reference to the accompanying drawings, in which various embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will also be understood that when an element (or layer) is referred to as being 'on' another layer or element, it can be directly on the other layer or element, or intervening layers or elements may also be present. Also, it will be understood that when an element is referred to as being "directly on" or "right on" another element, it can be directly on the other element or no intervening constituent element or layer is present. As used herein, the term "and/or" includes any and all combinations of one or more of the associated listed items.

Spatially relative terms "bottom (below)", "bottom (beneath)", "bottom (lower)", "above (above)", "top (upper)", etc. can be used to describe the correlation between one element or components and other element or components as shown in the drawings. It will also be understood that spatially relative terms includes directions different from each other of elements during usage or operation in addition to the direction indicated on the drawings. Like reference numerals refer to like elements throughout.

Although terms like a first and a second are used to describe various members, components, regions, layers, and/or portions in various embodiments of the present disclosure, the members, components, regions, layers, and/or portions are not limited to these terms. These terms are used only to differentiate one member, component, region, layer, or portion from another one. Therefore, a member, a component, a region, a layer, or a portion referred to as a first member, a first component, a first region, a first layer, or a first portion in an embodiment can be referred to as a second member, a second component, a second region, a second layer, or a second portion in another embodiment.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments in the detailed description will be described with sectional views and/or plan views as ideal exemplary views of the present disclosure. Accordingly, shapes of the exemplary views may be modified according to manufacturing techniques and/or allowable errors. Therefore, the embodiments of the present disclosure are not limited to the specific shape illustrated in the exemplary views, but may include other shapes that may be created according to manufacturing processes. Areas exemplified in the drawings have general properties, and are used to illustrate a specific shape of a device region. Thus, this should not be construed as limited to the scope of the present disclosure.

Hereinafter, exemplary embodiments of the invention will be described in detail with reference to the accompanying drawings.

FIG. 1 is an exploded perspective view of an exemplary embodiment of a display apparatus according to the invention.

Referring to FIG. 1, an exemplary embodiment of a display apparatus 1000 includes a display panel 100, a backlight unit 200, a mold frame 300, an accommodation member 400, and a cover member 500.

In such an embodiment, as shown in FIG. 1, the display panel 100 may have a long side in a first direction D1 and a short side in a second direction D2 crossing the first direction D1. The first direction D1 may correspond to a row direction, and the second direction D2 may correspond to a column direction.

In an exemplary embodiment, the display panel 100 may be a liquid crystal display panel. In such an embodiment, the display panel 100 may include a display substrate (not shown) on which a plurality of pixels (not shown) for displaying an image using light provided from the backlight unit 200 are disposed and an opposed substrate 120 facing the display substrate (not shown). Although not shown, the display panel 100 may include a liquid crystal layer (not shown) disposed between the display substrate (not shown) and the opposed substrate (not shown).

A surface (e.g., an upper surface) of the display panel 100 includes a display area DA on which the pixels (not shown) are disposed and a non-display area NDA around the display area DA.

The backlight unit 200 is disposed below the display panel 100 to provide light to the display panel 100.

In an exemplary embodiment, the backlight unit 200 may be an edge type backlight unit, but the invention is not limited thereto. In one alternative exemplary embodiment, for example, the backlight unit 200 may be a direct type backlight unit. In an exemplary embodiment, as shown in FIG. 1, the edge type backlight unit 200 includes a light source LS, an optical member 210 (e.g., an optical sheet or layer), a light guide plate 220, a reflection member 230 (e.g., a reflection sheet or layer) and a reinforcing member 240 (e.g., reinforcing sheet or layer). Each of the optical member 210, the light guide plate 220, the reflection member 230 and the reinforcing member 240 may have a long side in the first direction D1 and a short side in the second direction D2.

The light source LS is disposed adjacent to a side surface of the light guide plate 220 in the second direction D2. The reflection member 230 is disposed on a lower portion of the light guide plate 220, and the optical member 210 is disposed on the light guide plate 220. The display panel 100 is disposed above the optical member 220. Herein, a surface or side in a direction may mean a surface or side facing the direction, or a surface or side substantially perpendicular to the direction.

The light source LS emits light to be provided to the display panel 100 to the light guide plate 220. The light source LS includes a light source substrate SUB and a plurality of light source units LSU disposed or mounted on the light source substrate SUB.

The light source substrate SUB may extend in the first direction D1. The light source units LSU may be disposed on a side surface of the light source substrate SUB in the second direction D2. The light source units LSU may be spaced apart from each other with a predetermined distance in the first direction D1.

The light source units LSU generate light. The light generated from the light source units LSU is provided to the light guide plate 220.

The light guide plate 220 changes a traveling direction of the light provided from the light source units LSU toward an upper side at which the display panel 100 is disposed. Although not shown, the light guide plate 220 may have a bottom surface in which a pattern or a groove is defined to scatter incident light and a top surface on which a pattern having a lens shape or a groove shape is defined.

The light guide plate 220 includes a material having high optical transmittance in a visible light region. In one exemplary embodiment, for example, the light guide plate 220 may include polymethylmethacrylate ("PMMA").

The optical member 210 is disposed on the light guide plate 220. The light guided upward by the light guide plate 220 may be diffused and collected by the optical member 210 and then provided to the display panel 100. Although not shown, the optical member 210 may include a diffusion sheet (not shown), a prism sheet (not shown) or a protection sheet (not shown).

The reflection member 230 is disposed on a lower portion of the light guide plate 220. The reflection member 230 reflects light emitted to a lower side of the light guide plate 220 upward back to the light guide plate 220. The reflection member 230 includes a light reflecting material. In one exemplary embodiment, for example, the reflection member 230 may include aluminum.

The reinforcing member 240 is disposed on a lower portion of the reflection member 230. The reinforcing member 240 has a stiffness greater than a predetermined value to support the backlight unit 200. In an exemplary embodiment, the reinforcing member 240 may include a reflective material. In such an embodiment, the reflection member 230 may be removed.

In an exemplary embodiment, as shown in FIG. 1, the reinforcing member 240 has a flat plate shape, but not being limited thereto. In one alternative exemplary embodiment, for example, the reinforcing member 240 may have a frame shape.

The mold frame 300 is disposed above the light guide plate 220. The mold frame 300 has a predetermined frame shape. In one exemplary embodiment, for example, the mold frame 300 may be disposed to correspond to an edge on a top surface of the light guide plate 220. The mold frame 300 fixes the display panel 100 and the backlight unit 200.

The accommodation member 400 defines the lowermost portion of the display apparatus 1000, and accommodates the backlight unit 200. The accommodation member 400 has a stiffness greater than a predetermined value to accommodate the backlight unit 200. In one exemplary embodiment, for example, the accommodation member 400 may include metal.

The accommodation member 400 includes a bottom part 410 and a plurality of first and second side surface parts 420 and 430 which are connected to the bottom part 410. In an exemplary embodiment, each of the first side parts 420 is disposed adjacent to a side of the bottom part 410 in the second direction D2, and the first side parts 420 are disposed opposite to each other. Each of the second side parts 430 is disposed adjacent to a side of the bottom part 410 in the first direction D1, and the second side parts 430 are disposed opposite to each other. In such an embodiment, the bottom part 410 may have a long side in the first direction D1 and a short side in the second direction D2.

The light source LS may be disposed on an inner surface of one of the sidewall parts 420 and 430 of the accommodation member 400.

In an exemplary embodiment, the accommodation member 400 may have a prefabricated structure. In such an embodiment, the bottom part 410 and the first and second side surface parts 420 and 430 are prefabricated parts of the accommodation member 400. In an exemplary embodiment, the accommodation member 400 may be separable into the bottom part 410, the first side surface parts 420 and the second side surface parts 430. In such an embodiment, the bottom part 410, the first side surface parts 420 and the second side surface parts 430 are not integrally formed as a single unitary and indivisible unit. The bottom part 410 may be connected to and assembled with the first side surface parts 420 and the second side surface parts 430 to define the accommodation member 400.

The bottom part 410, the first side surface parts 420 and the second side surface parts 430 are assembled with each other in various ways to define the accommodation member 400 having one of a plurality shapes having different sizes from each other to correspond to a size of the display panel 100. Descriptions for a shape of the accommodation member 400 will be described in more detail in FIG. 2.

The cover member 500 is disposed on the display panel 100. The cover member 500 has a frame shape. The cover member 500 includes a first cover part 510 disposed on the display panel 100 to cover the non-display area NDA of the display panel 100, a second cover part 520 defining a sidewall of the cover member 500, and an open portion OP defined inside the first cover part 510 to expose the display area DA of the display panel 100.

In an exemplary embodiment, the second cover part 520 is connected to an outer portion of the first cover part 510 to extend downward. In such an embodiment, the first cover part 510 and the second cover part 520 may be disposed perpendicular to each other. The second cover part 520 is disposed to surround outer side surfaces of the accommodation member 400.

Figure 2:
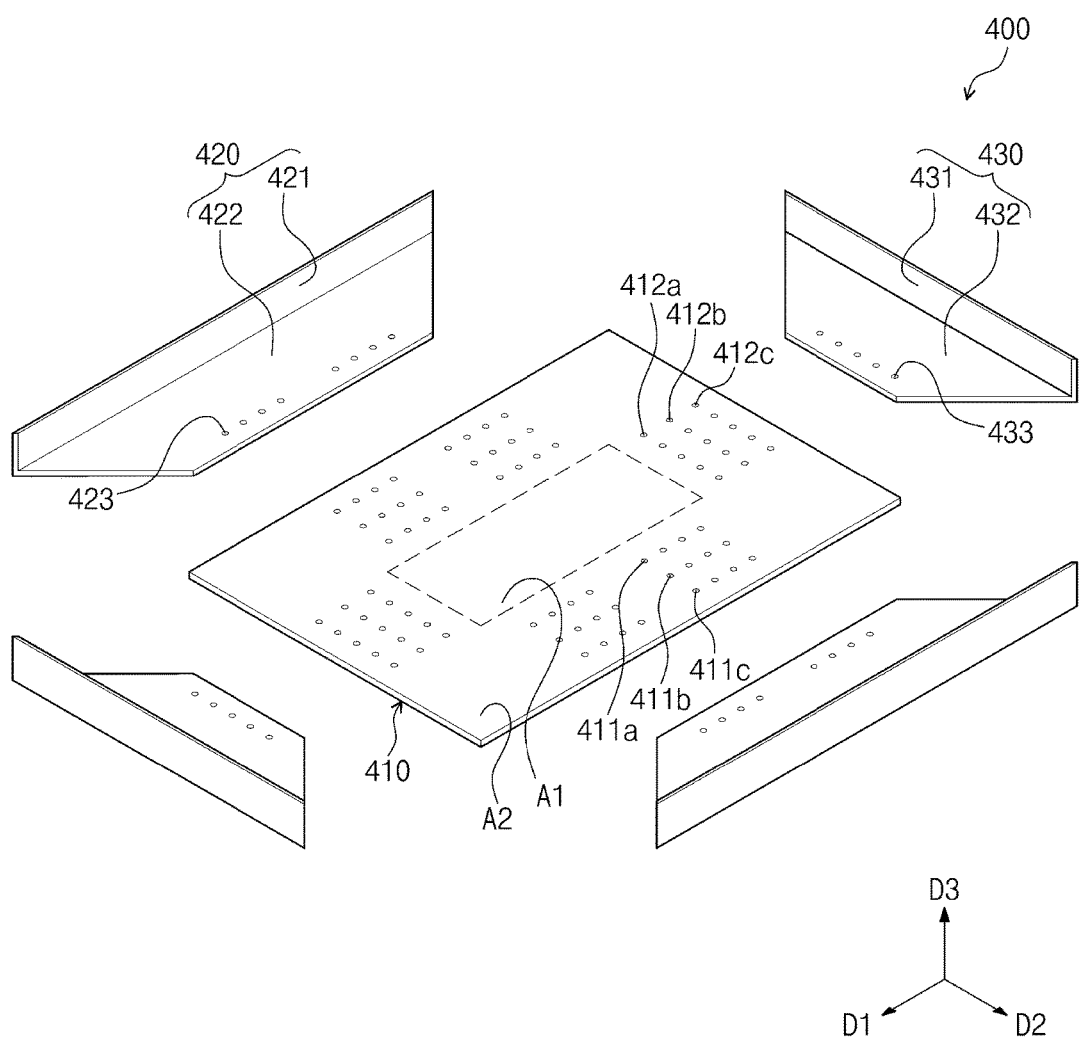
FIG. 2 is an exploded perspective view of an exemplary embodiment of an accommodation member according to the invention.

FIG. 2 is an exploded perspective view of an exemplary embodiment of an accommodation member according to the invention.

Referring to FIG. 2, an exemplary embodiment of the accommodation member 400 may be separable into the bottom part 410, the first side surface parts 420 and the second side surface parts 430.

The bottom part 410 may be disposed on a lower portion of the reinforcing member 240. The bottom part 410 includes a central area A1 corresponding to a predetermined area of a central portion of the bottom part 410 and an edge area A2 surrounding the central area A1.

In an exemplary embodiment, a plurality of first bottom holes 411a to 411c and a plurality of second bottom holes 412a to 412c are defined or formed through the edge area A1 of the bottom part 410. Each of the first bottom holes 411a to 411c and the second bottom holes 412a to 412c may be arranged substantially in a matrix form.

In an exemplary embodiment, the first bottom holes 411a to 411c are defined in both sides of edge area A2 of the bottom part 410 in the second direction D2, respectively. The first bottom holes 411a to 411c are arranged in a matrix form having a plurality of rows in the first direction D1.

The first bottom holes 411a to 411c are defined by a plurality of first to third sub bottom holes 411a to 411c. The respective holes of the first sub bottom holes 411a, the second sub bottom holes 411b and the third sub bottom holes 411c are arranged in a same row of the first bottom holes 411a to 411c in the first direction D1.

The first sub bottom holes 411a are disposed adjacent to the central area A1 in the second direction D2. The third sub bottom holes 411c are disposed adjacent to opposing boundaries (e.g., side edges) of the bottom part 410 in the second direction D2. The second sub bottom holes 411b are disposed between the first sub bottom holes 411a and the third sub bottom holes 411c.

The second bottom holes 412a to 412c are disposed on opposing sides of the edge area A2 of the bottom part 410 in the first direction D1. The second bottom holes 412a to 412c are arranged in a matrix form having a plurality of rows in the second direction D2.

The second bottom holes 412a to 412c are defined by a plurality of fourth to sixth sub bottom holes 412a to 412c. The respective holes of the fourth sub bottom holes 412a, the fifth sub bottom holes 412b and the sixth sub bottom holes 412c are arranged in a same row of the second bottom holes 412a to 412c in the second direction D2.

The fourth sub bottom holes 412a are disposed adjacent to the central area A1 in the first direction D1. The sixth sub bottom holes 412c are disposed adjacent to opposing boundaries of the bottom part 410 in the first direction D1. The fifth sub bottom holes 412b are disposed between the fourth sub bottom holes 412a and the sixth sub bottom holes 412c.

The first side surface parts 420 and the second side surface parts 430 are connected to the bottom part 410 and define the side surfaces of the accommodation member 400.

The first side surface parts 420 are disposed corresponding to, e.g., adjacent to, opposing sides of the bottom part 410 in the second direction D2, respectively. The first side surface parts 420 are disposed opposite to each other. Each of the first side surface parts 420 extends in the first direction D1.

The second side surface parts 430 are disposed adjacent to opposing sides of the bottom part 410 in the first direction D1, respectively. The second side surface parts 430 are disposed opposite to each other. Each of the second side surface parts 430 extends in the second direction D2. Each of the second side surface parts 430 may have a length in the second direction D2, which is less than a length of the first side surface part 420 in the extending direction, that is, the first direction D1.

The first side surface parts 420 may be disposed adjacent to the edge area A2 of the bottom part 410 extending in the first direction D1. Each of the first side surface parts 420 may have a trapezoid shape.

In an exemplary embodiment, each of the first side surface parts 420 includes a first vertical part 421 and a first horizontal part 422. The first vertical part 421 extends upward with respect to the bottom part 410. The first horizontal part 422 is connected to a lower portion of the first vertical part 421 and extends therefrom horizontally with respect to the bottom part 410. In an exemplary embodiment, the length of the first vertical part 421 may be substantially the same as the length of the long side of the bottom part 410 in the first direction D1.

In an exemplary embodiment, the horizontal part 422 has a length that gradually decreases toward the central area A1 of the bottom part 410 in the second direction D2. In such an embodiment, each of both side surfaces of the first horizontal part 422 has an inclined surface.

In an exemplary embodiment, a plurality of first side surface holes 423 is defined in or through the first side surface part 420. In such an embodiment, the first side surface holes 423 are defined in the first horizontal part 422 of the first side surface part 420. The first side surface holes 423 are disposed or arranged along the first direction D1. Arrangement of the first side surface holes 423 corresponds to the arrangement of the first bottom holes 411a to 411c, e.g., an arrangement of sub holes of the first bottom holes 411a to 411c in the first direction D1.

The second side surface parts 430 may be disposed adjacent to the edge area A2 of the bottom part 410 in the first direction D1. Each of the second side surface parts 430 may have a trapezoid shape.

In an exemplary embodiment, each of the second side surface parts 430 includes a second vertical part 431 and a second horizontal part 432. The second vertical part 431 extends upward with respect to the bottom part 410. The second horizontal part 432 is connected to a lower portion of the second vertical part 431 to horizontally extend therefrom. In an exemplary embodiment, a length of the second vertical part 431 may have substantially the same as the length of the short side of the bottom part 410 in the second direction D2.

In an exemplary embodiment, the horizontal part 432 has a length in the second direction D2, which gradually decreases toward the central area A1 of the bottom part 410. In such an embodiment, each of both side surfaces of the second horizontal part 432 has an inclined surface.

The second side surface part 430 includes a plurality of second side surface holes 433. The second side surface holes 433 are defined in a second horizontal part 432 of the second side surface part 430. The second side surface holes 423 are arranged along the second direction D2. An arrangement of the second side surface holes 433 corresponds to an arrangement of the second bottom holes 412a to 412c, e.g., an arrangement of sub bottom holes of the second bottom holes 412a to 412c in the second direction D2.

Figure 3A:
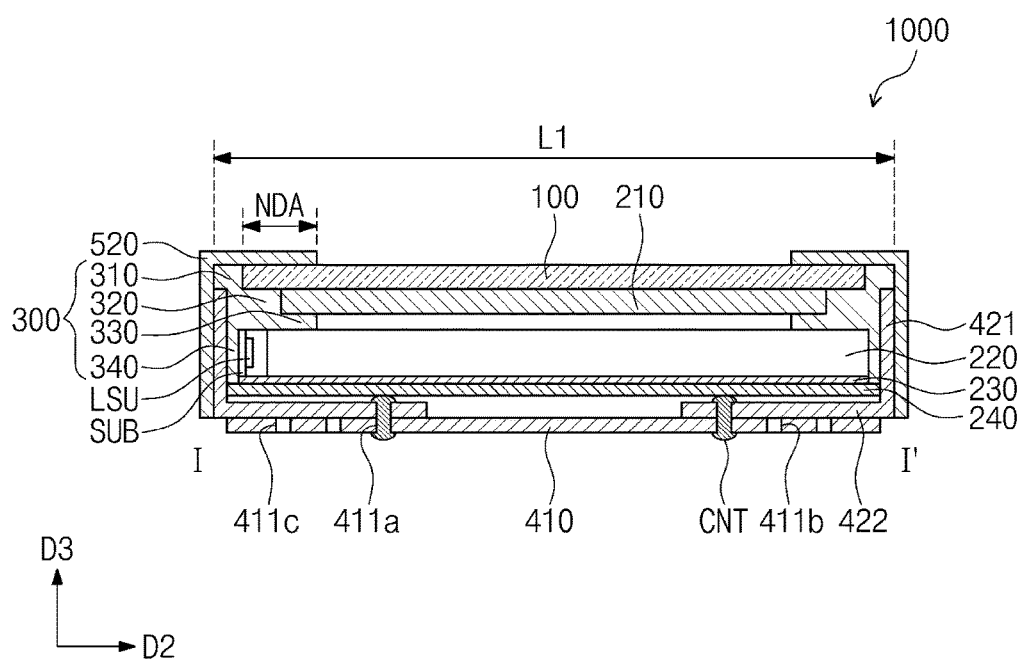
FIG. 3A is a cross-sectional view taken along line I-I' of the display apparatus of FIG. 1, when the display apparatus has a first size.

The first side surface holes 423 may be coupled to one of the first to third sub bottom holes 411a to 411c by a connection member CNT (shown in FIG. 3A).

The second side surface holes 433 may be coupled to one of the fourth to sixth sub bottom holes 412a to 411c by the connection member CNT.

Hereinafter, the coupling between the first and second bottom holes 411a to 411c and 412a to 412c and the side surface holes 422 and 423 will be described in more detail.

Figure 3B:
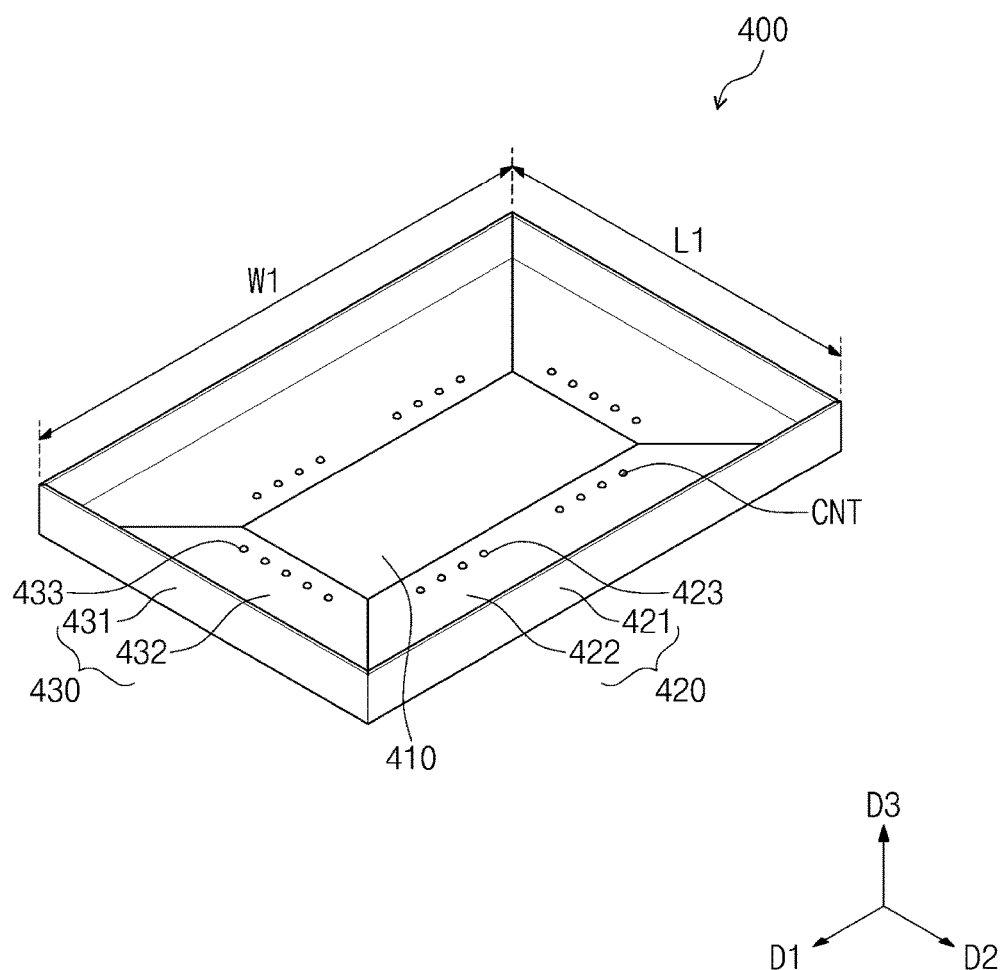
FIG. 3B is a perspective view of an accommodation member in FIG. 3A.

FIG. 3A is a cross-sectional view taken along line I-I' of the display apparatus shown in FIG. 1 when the display apparatus has a first size, and FIG. 3B is a perspective view of the accommodation member in FIG. 3A.

Referring to FIGS. 3A and 3B, an exemplary embodiment of a display apparatus 1000 having a first size may have a first width W1 in the first direction D1 and a first length L1 in the second direction D2.

In an exemplary embodiment, a non-display area NDA of the display panel 100 may be fixedly disposed between the first cover part 510 of the cover member 500 and the mold frame 300. In such an embodiment, the non-display area NDA of the display panel 100 may have a top surface contacting the first cover part 510 of the cover member 500 and a bottom surface fixedly contacting the mold frame 300.

The second cover part 520 of the cover member 500 is disposed to surround outer side surfaces of the first and second side surface parts 420 and 430 of the accommodation member 400. In such an embodiment, the second cover parts 520 have an inner side surface contacting the outer side surfaces of the first and second side surface parts 420 and 430 of the accommodation member 400.

The mold frame 300 may have a frame shape surrounding an edge of each of the optical member 220 and the display panel 100. In an exemplary embodiment, the mold frame 300 is disposed to correspond to an edge of a top surface of the light guide plate 220 to fix the light guide plate 220 and other members of the backlight unit 200 disposed therebelow (e.g., a reflection member 230 or the reinforcing member 240) to the bottom part 410 of the accommodation member 400 so that the light guide plate 220 does not move.

The mold frame 300 may have a cross-section including a first extension part 310, a second extension part 320, a third extension part 330 and a fourth extension part 340. The first to fourth extension parts 310 to 340 extend in a horizontal direction.

In an exemplary embodiment, as shown in FIG. 3A, the first to third extension parts 310 to 330 are connected to each other to have a stair-shaped cross-section. In such an embodiment, the first extension part 310 is disposed on a lower portion of the first cover part 510 of the cover member 500 and has a top surface contacting an inner side surface of the first cover part 510. The first extension part 310 has an outer side surface of the frame thereof, which contacts an inner side surface of the second cover part 520 in the horizontal direction.

The second extension part 320 is connected to a lower end of a corresponding side of the first extension part 310 in the horizontal direction. The second extension part 320 horizontally extends along the first and second side surface parts 420 and 430 of the accommodation member 400. The second extension part 320 has a top surface lower than that of the first extension part 310. The display panel 100 may be disposed or seated on the top surface of the second extension part 320.

The third extension part 330 is connected to a lower end of a corresponding side of the second extension part 320 in the horizontal direction. The third extension part 330 horizontally extends along an edge of a top surface of the light guide plate 220. The third extension part 330 has a top surface lower than that of the second extension part 320. The optical member 210 may be disposed or seated on the top surface of the third extension part 330.

In an exemplary embodiment, where the first extension part 310, the second extension part 320 and the third extension part 330 are connected to each other to form the stair shape, a stepped portion may be defined between the display panel, the optical member 210, which is seated inside the display panel 100 and the mold frame 300, and the light guide plate 220. In such an embodiment, the display panel 100, the optical member 210 and the light guide plate 220 may be spaced apart from each other without contacting each other.

The fourth extension part 340 is connected to a lower end outside the frame of the third extension part 330 in the horizontal direction. The fourth extension part 330 has an outer side surface contacting an inner side surface of the first and second side surface parts 420 and 430 of the accommodation member 400 and an inner side surface contacting a rear surface of the light source substrate SUB or one side surface of the light guide plate 220 in the horizontal direction.

Although the shape of the mold frame 300 in an embodiment of the invention is described above, the invention is not limited thereto. In one alternative exemplary embodiment, for example, the mold frame 300 may have a shape in which additional shape (e.g., extension part) is added, or one of the first to fourth extension parts 310 to 340 is omitted.

In an exemplary embodiment, a light source substrate SUB is disposed on an inner side surface of one of the fourth extension members 340 of the mold frame 300. In such an embodiment, light source units LSU are disposed or mounted on a front surface of the light source substrate SUB, and a rear surface of the light source substrate SUB contacts an inner side surface of the fourth extension part 340 of the mold frame 300. The light source units LSU are disposed along a side surface of the light guide plate 220 to face a side surface of the light guide plate 220. Accordingly, in such an embodiment, light provided from the light source units LSU may be incident into the light guide plate 220 through the side surface of the light guide plate 220.

In an exemplary embodiment, the bottom part 410 of the accommodation member 400 is connected to the first and second side surface parts 420 and 430. In such an embodiment, a bottom surface of the first horizontal part 422 of the first side surface parts 420 and a bottom surface of the second horizontal part 432 of the second side surface parts 430 may contact a top surface of the edge area A2 of the bottom part 410.

The bottom part 410 may be coupled to the first and second side surface parts 420 and 430 by the connection member CNT. The connection member CNT passes through side surface holes 423 and 433 and the first and second bottom holes 411a to 411c and 412a to 412c. In one exemplary embodiment, for example, the connection member CNT may be a nail or screw.

As illustrated in FIGS. 3A and 3B, when the display apparatus 1000 has the first size, the first side surface holes 423 of the first side surface part 420 may be coupled to the first sub bottom holes 411a of the bottom part 410 by the connection member CNT. The second side surface holes 433 of the second side surface part 430 may be coupled to the fourth sub bottom holes 412a of the bottom part 410 by the connection member CNT.

The first side surface parts 420 of the display apparatus 1000 having the first size may be connected to the second side surface parts 430 adjacent thereto, respectively. Accordingly, the accommodation member 400 of the display apparatus 1000 having the first size may have a frame shape including the bottom part 410.

The reinforcing member 240 is disposed on a lower portion of the reflection member 230. The reinforcing member 240 support loads of the display panel 100, the backlight unit 200, and the light source LS to planarize an uneven bottom inner side surface of the accommodation member 400 by the connection member CNT.

In an exemplary embodiment, where the first and second side surface parts 420 and 430 are disposed on a top surface of the edge area A2 of the bottom part 400, the central area A1 of the bottom part 400 of the accommodation member 400 may have a recessed shape. The reinforcing member 240 is disposed on the accommodation member 400 to compensate for the uneven bottom surface of the accommodation member 400 by the central area A1 and the connection member CNT.

Figure 4A:
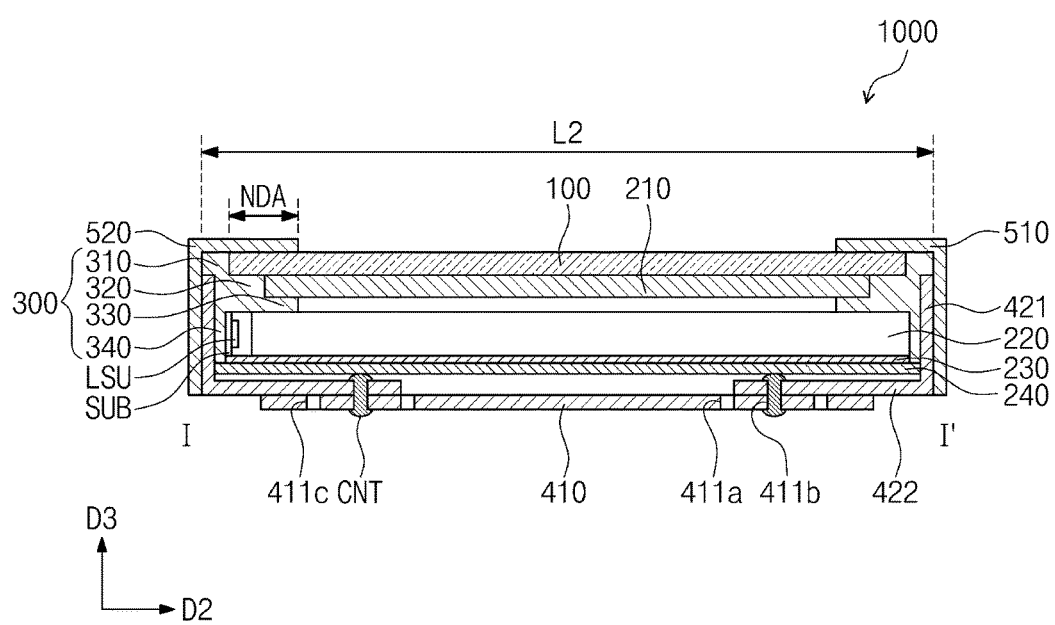
FIG. 4A is a cross-sectional view taken along line I-I' of the display apparatus of FIG. 1 when the display apparatus has a second size.
Figure 4B:
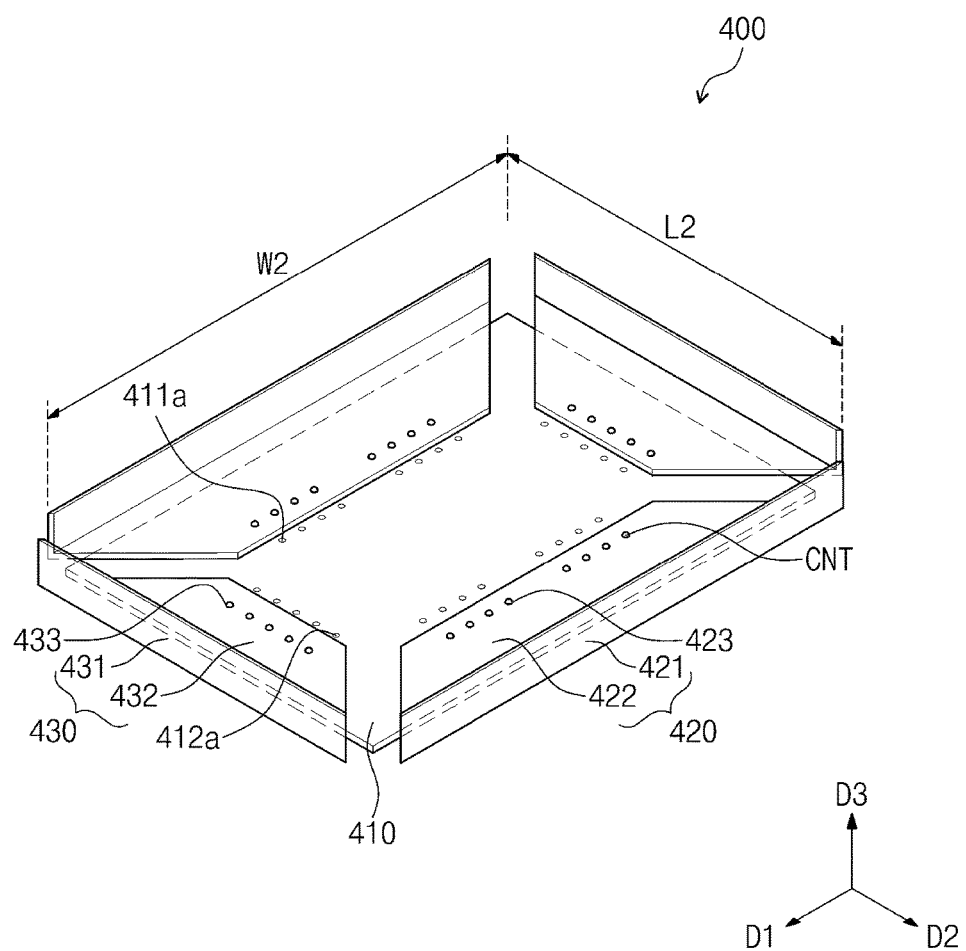
FIG. 4B is a perspective view of an accommodation member in FIG. 4A.

FIG. 4A is a cross-sectional view taken along line I-I' of the display apparatus of FIG. 1 when the display apparatus has a second size, and FIG. 4B is a perspective view of the accommodation member in FIG. 4A.

Referring to FIGS. 4A and 4B, the display apparatus 1000 having the second size may have a second width W2 in the first direction D1 and a second length L2 in the second direction D2. The second width W2 is greater than the first width W1, and the second length L2 is greater than the first length L1.

When the display apparatus 1000 has the second size, the first side surface holes 423 of the first side surface part 420 may be coupled to the second sub bottom holes 411b of the bottom part 410 by the connection member CNT. The second side surface holes 433 of the second side surface part 430 may be coupled to the fifth sub bottom holes 412b of the bottom part 410 by the connection member CNT.

Figure 5A:
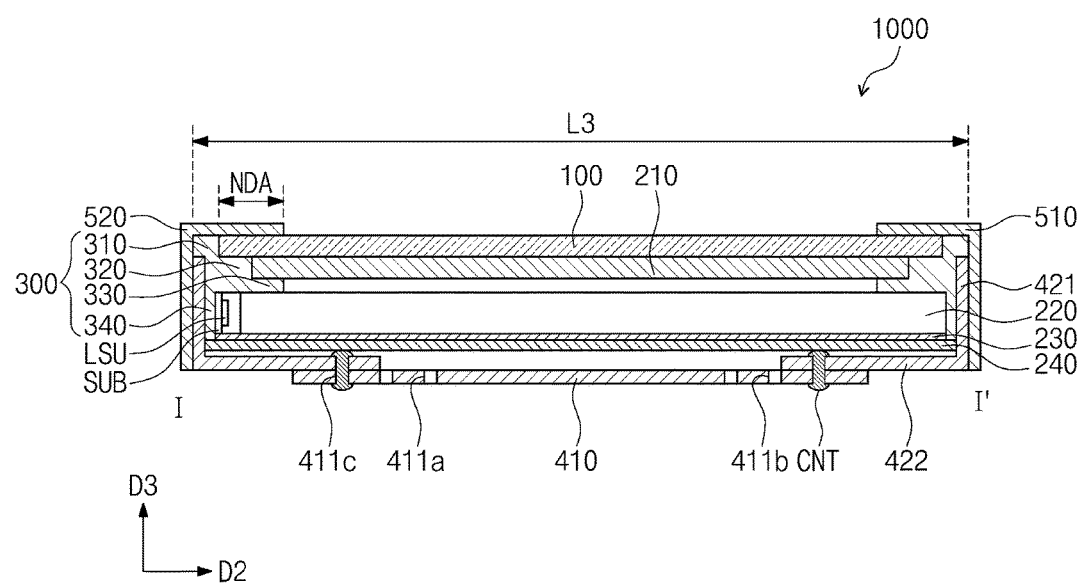
FIG. 5A is a cross-sectional view taken along line I-I' of the display apparatus of FIG. 1 when the display apparatus has a third size.
Figure 5B:
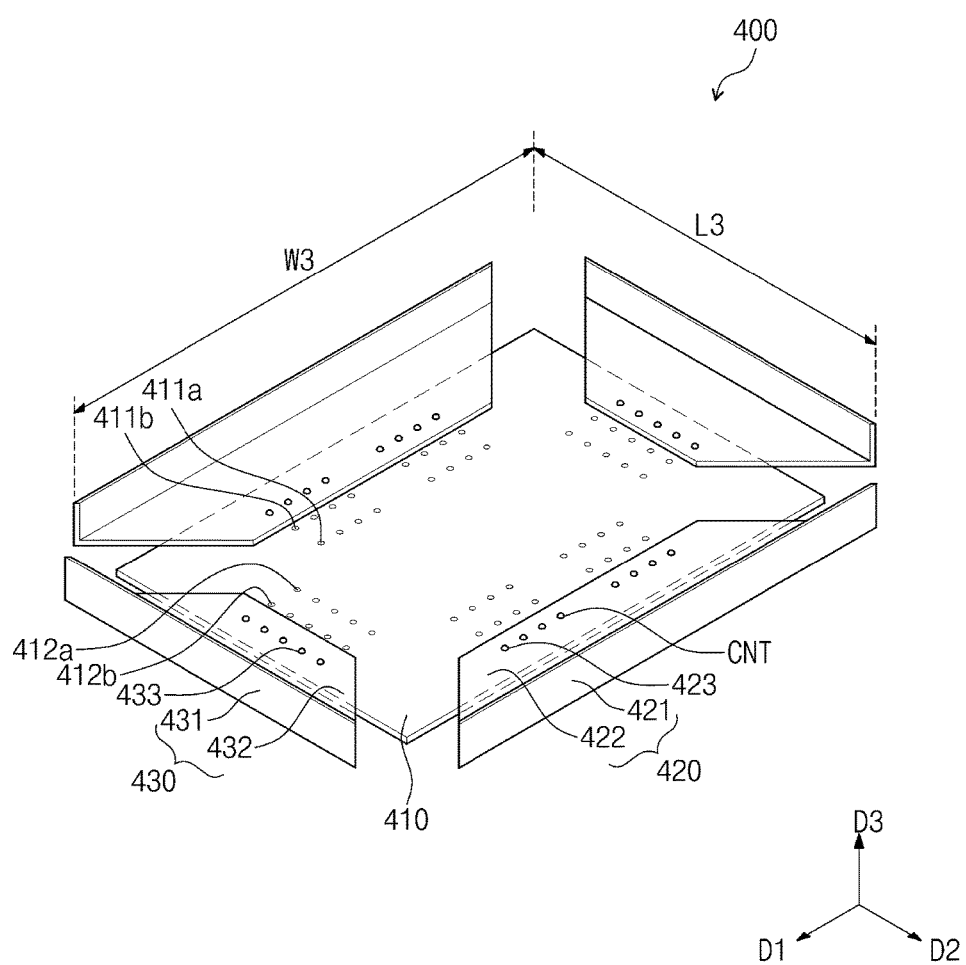
FIG. 5B is a perspective view of an accommodation member in FIG. 5A.

FIG. 5A is a cross-sectional view taken along line I-I' of the display apparatus of FIG. 1 when the display apparatus has a third size, and FIG. 5B is a perspective view of the accommodation member in FIG. 5A.

Referring to FIGS. 5A and 5B, the display apparatus 1000 having the third size has a third width W3 in the first direction D1 and a third length L3 in the second direction D2. The third width W3 is greater than the second width W2, and the third length L3 is greater than the second length L2.

When the display apparatus 1000 has the third size, the first side surface holes 423 of the first side surface part 420 may be coupled to the third sub bottom holes 411c of the bottom part 410 by the connection member CNT. The second side surface holes 433 of the second side surface part 430 may be coupled to the sixth sub bottom holes 412c of the bottom part 410 by the connection member CNT.

In an exemplary embodiment, where the first and second side surface parts 420 and 430 are disposed on a top surface of the edge area A2 of the bottom part 400, the central area A1 of the bottom part 400 of the accommodation member 400 may have a recessed shape. In such an embodiment, the reinforcing member 240 is disposed on the accommodation member 400 to compensate for the uneven bottom surface of the accommodation member 400 by the central area A1 and the connection member CNT.

In such an embodiment, when the display apparatus 1000 has the second or third size, the first side surface part 420 is not connected to the second side surface parts 430 and spaced apart from the second side surface parts 430 with a predetermined distance. In such an embodiment, when the display apparatus 1000 has the second or third size, the backlight unit 200 may be exposed to the outside by the predetermined distance. In such an embodiment, the reinforcing member 240 is disposed on the accommodation member 400, such that the backlight unit 200 may not be exposed to the outside.

In an exemplary embodiment of the invention, the accommodation member 400 of the display apparatus 1000 may have various sizes, not being limited to the first to third sizes described above. In an exemplary embodiment, the position where the first side surface part 420 is connected to the bottom part 410 and the position where the second side surface part 430 is connected to the bottom part 410 may independently vary.

In an exemplary embodiment, the accommodation member 400 of the display apparatus 1000 may be assembled according to a predetermined size thereof. In such an embodiment, when the bottom part 410 and the first and second side surface parts 420 and 430 are manufactured with a predetermined size and assembled in various way to allow the size of the accommodation member 400 to vary, additional equipment costs for manufacturing the accommodation members 400 having different sizes may be substantially reduced.

Accordingly, in such an embodiment, the manufacturing cost of the display apparatus 1000 may be substantially reduced.

Figure 6A:
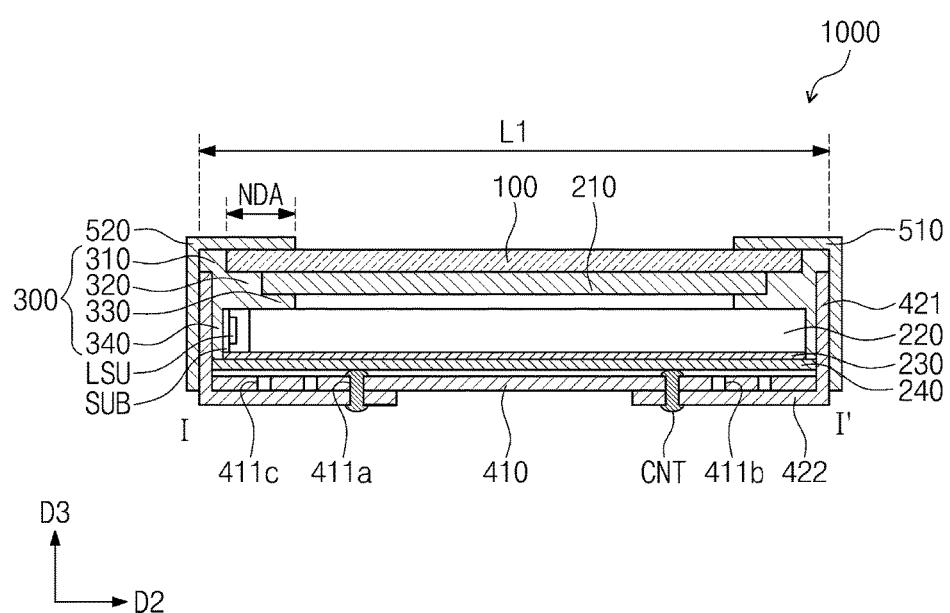
FIG. 6A is a cross-sectional view of an alternative exemplary embodiment of the display apparatus according to the invention when the display apparatus has the first size.
Figure 6B:
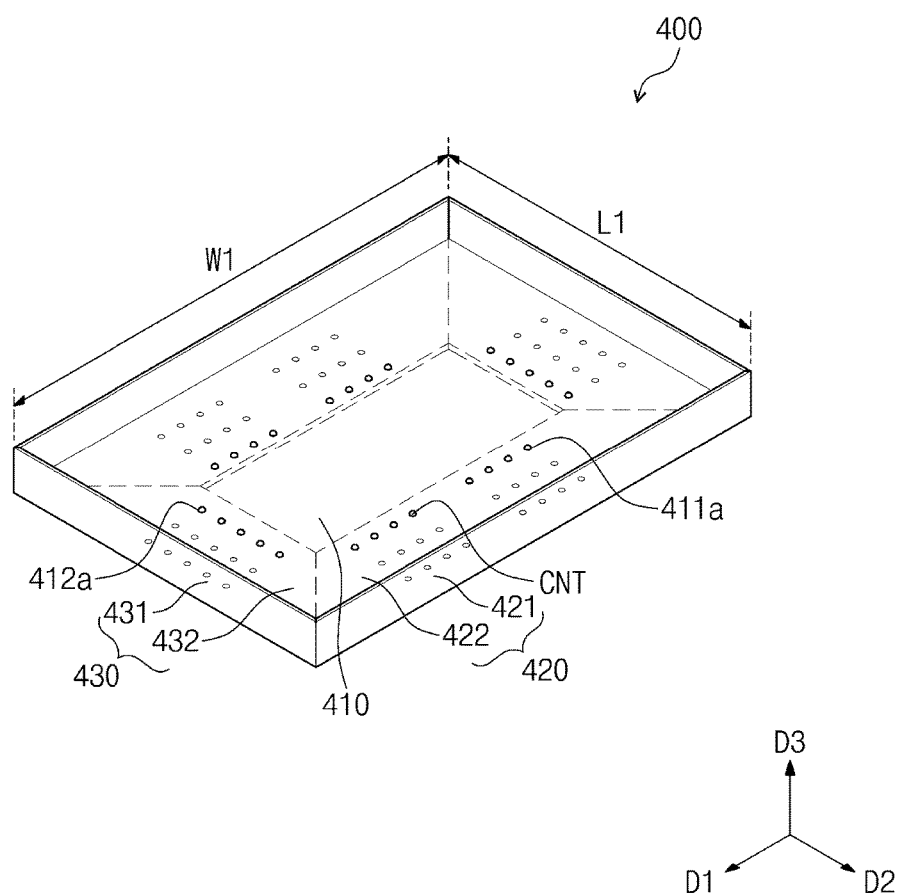
FIG. 6B is a perspective view of an accommodation member illustrated in FIG. 6A.

FIG. 6A is a cross-sectional view of an alternative exemplary embodiment of the display apparatus according to the invention, when the display apparatus has a first size, and FIG. 6B is a perspective view of the accommodation member in FIG. 6A.

An exemplary embodiment of a display apparatus 1000 shown in FIGS. 6A and 6B is substantially the same as the exemplary embodiments of the display apparatus 1000 described above with reference to FIGS. 1 to 5B except for the accommodation member 400. The same or like elements shown in FIGS. 6A and 6B, e.g., the constitutions of the display panel 100, the backlight unit 200, the mold frame 300 and the cover member 500, have been labeled with the same reference characters as used above to describe the exemplary embodiments of the display apparatus 1000, and any repetitive detailed description thereof will hereinafter be omitted.

Referring to FIGS. 6A and 6B, in an exemplary embodiment, a bottom part 410 of an accommodation member 400 is connected to first and second side surface parts 420 and 430. In such an embodiment, a top surface of a first horizontal part 422 of the first side surface part 420 and a top surface of a second horizontal part 432 of the second side surface part 430 contact a bottom surface of an edge area A2 of the bottom part 410.

When the display apparatus 1000 has a first size, the first side surface holes 423 of the first side surface part 420 may be coupled to first sub bottom holes 411a of the bottom part 410 by a connection member CNT. Second side surface holes 433 of the second side surface part 430 may be coupled to the fourth sub bottom holes 412a of the bottom part 410 by the connection member CNT.

The first side surface parts 420 of the display apparatus 1000 having the first size may be connected to the second side surface parts 430 adjacent thereto, respectively. Accordingly, the accommodation member 400 of the display apparatus 1000 having the first size may have a frame shape including the bottom part 410.

Figure 7A:
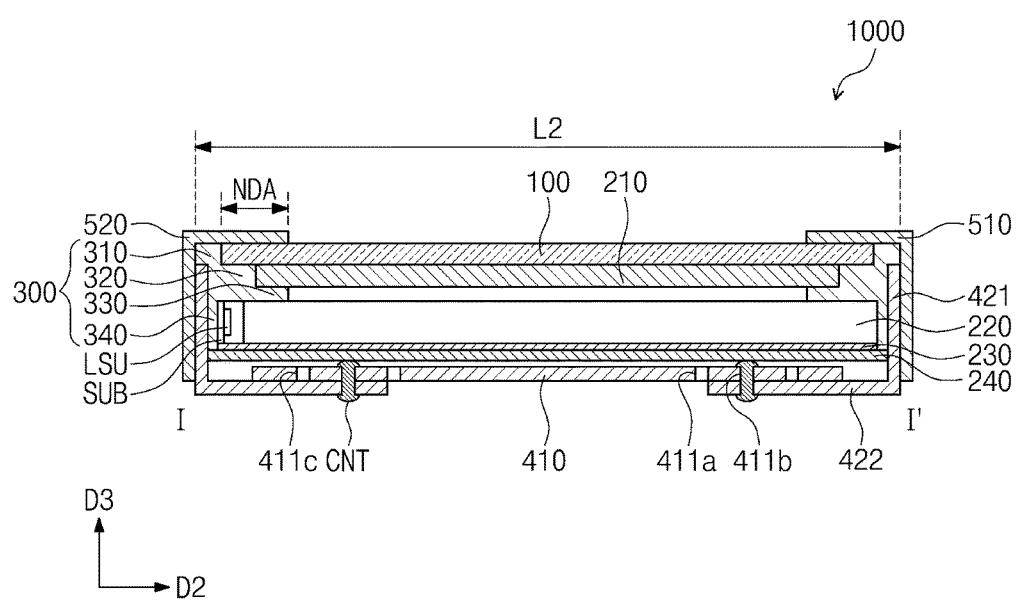
FIG. 7A is a cross-sectional view of an alternative exemplary embodiment of the display apparatus according to the invention when the display apparatus has the second size.
Figure 7B:
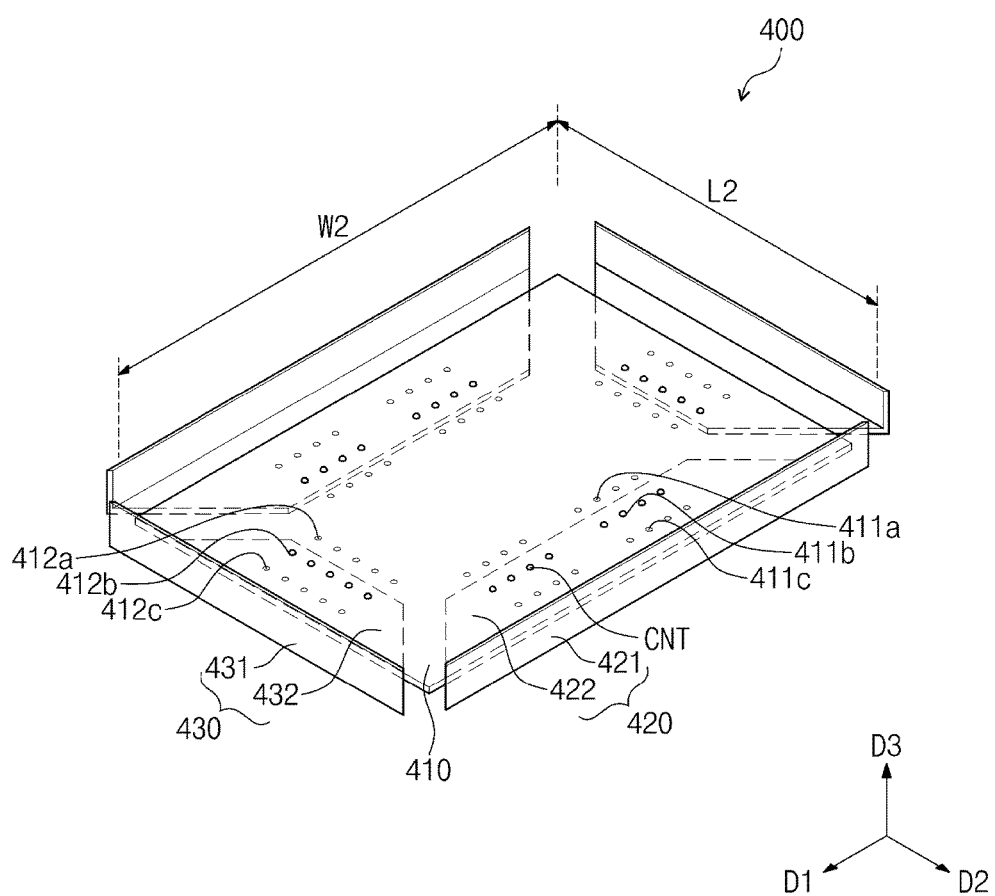
FIG. 7B is a perspective view of an accommodation member in FIG. 7A.

FIG. 7A is a cross-sectional view of an alternative exemplary embodiment of the display apparatus according to the invention when the display apparatus has a second size, and FIG. 7B is a perspective view of the accommodation member in FIG. 7A.

An exemplary embodiment of a display apparatus 1000 shown in FIGS. 7A and 7B is substantially the same as the exemplary embodiments of the display apparatus 1000 described above with reference to FIGS. 6A and 6B except for the size thereof. The same or like elements shown in FIGS. 7A and 7B have been labeled with the same reference characters as used above to describe the exemplary embodiments of the display apparatus 1000 with reference to FIGS. 1 to 6B, and any repetitive detailed description thereof will hereinafter be omitted.

Referring to FIGS. 7A and 7B, when such an embodiment of the display apparatus 1000 has the second size, the first side surface holes 423 of the first side surface part 420 may be coupled to the second sub bottom holes 411b of the bottom part 410 by the connection member CNT. The second side surface holes 433 of the second side surface part 430 may be coupled to fifth sub bottom holes 412b of the bottom part 410 by the connection member CNT.

Figure 8A:
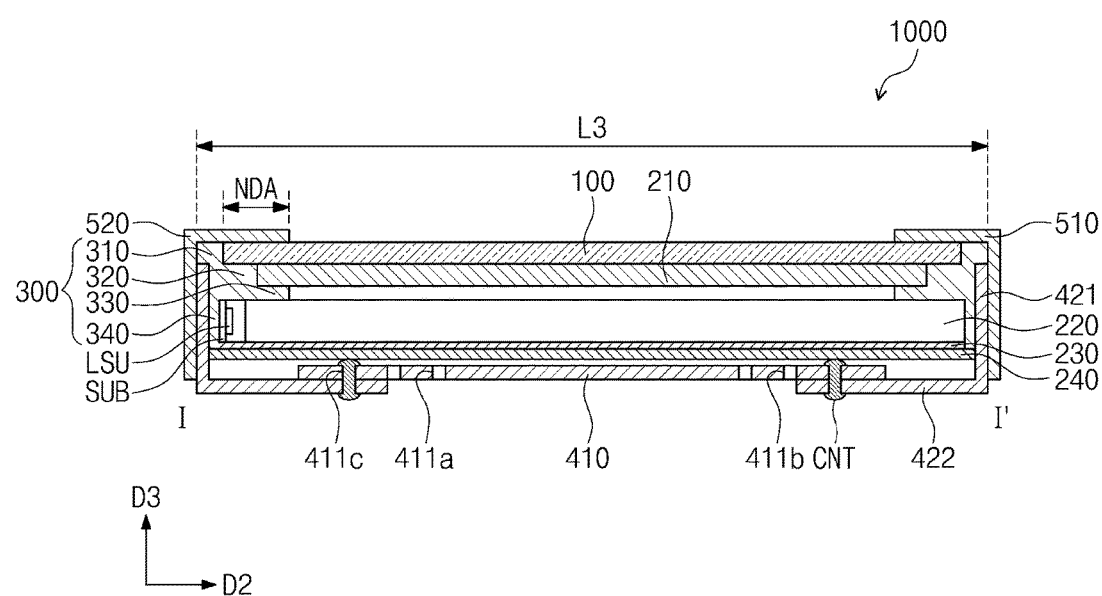
FIG. 8A is a cross-sectional view of an alternative exemplary embodiment of the display apparatus according to the invention when the display apparatus has the third size.
Figure 8B:
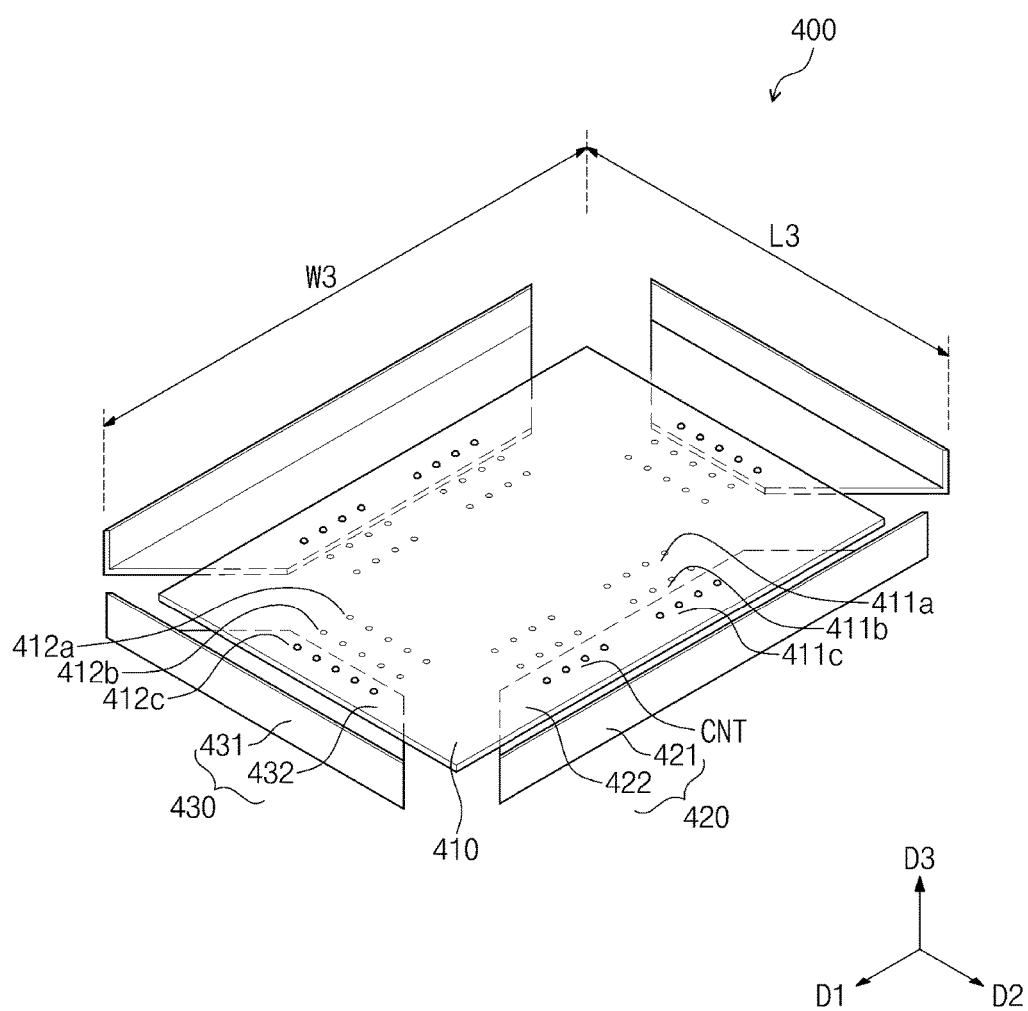
FIG. 8B is a perspective view of an accommodation member in FIG. 8A.

FIG. 8A is a cross-sectional view of an alternative exemplary embodiment of the display apparatus according to the invention when the display apparatus has a third size, and FIG. 8B is a perspective view of the accommodation member in FIG. 8A.

An exemplary embodiment of a display apparatus 1000 shown in FIGS. 8A and 8B is substantially the same as the exemplary embodiments of the display apparatus 1000 described above with reference to FIGS. 6A and 6B except for the size thereof. The same or like elements shown in FIGS. 8A and 8B have been labeled with the same reference characters as used above to describe the exemplary embodiments of the display apparatus 1000 with reference to FIGS. 1 to 7B, and any repetitive detailed description thereof will hereinafter be omitted.

Referring to FIGS. 8A and 8B, when such an embodiment of the display apparatus 1000 has the third size, the first side surface holes 423 of the first side surface part 420 may be coupled to third sub bottom holes 411c of the bottom part 410 by the connection member CNT. The second side surface holes 433 of the second side surface part 430 may be connected to the sixth sub bottom holes 412c of the bottom part 410 by the connection member CNT.

In such an embodiment, a reinforcing member 240 may be disposed on the accommodation member 400 to compensate for the uneven bottom surface of the accommodation member 400 by the connection member CNT.

In such an embodiment, when the display apparatus 1000 has the second or third size, the first side surface part 420 is not connected to the second side surface parts 430 adjacent thereto and is spaced apart from the second side surface parts 430 with a predetermined distance. In such an embodiment, when the display apparatus 1000 has the second or third size, a backlight unit 200 may be exposed to the outside by the predetermined distance. In such an embodiment, the reinforcing member 240 is disposed on the accommodation member 400, such that the backlight unit 200 may not be exposed to the outside.

In an alternative exemplary embodiment, the first side surface part 420 is disposed on the bottom part 410, and the second side surface part 430 may be disposed on a lower portion of the bottom part 410. In another alternative exemplary embodiment, the first side surface part 420 is disposed on the lower portion of the bottom part 410, and the second side surface part 430 may be disposed on the bottom part 410. In such an embodiment, each of the first side part 420 and the second side part 430 may be independently connected to the bottom part 410.

The accommodation member 400 of an exemplary embodiment of the display apparatus 1000 may be assembled according to the size thereof. In such an embodiment, the accommodation members 400 having various sizes may be defined or assembled with the bottom part 410 and the first and second side surface parts 420 and 430 having the same size, additional equipment costs for manufacturing the accommodation members 400 having various sizes may be reduced.

As set forth herein, exemplary embodiment of the display apparatus according to the invention may be reduced in manufacturing cost.

Although some exemplary embodiment of the invention has been described, the invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display apparatus, comprising:
a display panel;
a backlight unit; and
an accommodation member which accommodates the display panel and the backlight unit,
wherein the accommodation member comprises:
a bottom part defining a bottom surface of the accommodation member, at which a plurality of bottom holes is defined; and
a plurality of side surface parts which is connected to the bottom part and defines outermost side surfaces of the accommodation member,
wherein each of the side surface parts comprises:
a vertical part extending upward with respect to the bottom part; and
a horizontal part extending horizontally with respect to the bottom part and connected to a lower portion of the vertical part, a plurality of side surface holes defined in the horizontal part,
wherein a position where the side surface parts are connected to the bottom part varies based on sizes of the display panel and the backlight unit, and
wherein the position of the side surface parts define the outermost side surfaces defining the accommodation member and extend outwardly beyond an edge defining the bottom part of the accommodation member,
and wherein the plurality side surface holes are aligned with a portion of the bottom holes, which is determined based on the sizes of the display panel and the backlight unit.

2. The display apparatus of claim 1, wherein
the bottom part has long sides in a first direction and short sides in a second direction crossing to the first direction, and
the side surface parts comprise:
a plurality of first side surface parts corresponding to the long sides of the bottom part; and
a plurality of second side surface parts corresponding to the short sides of the bottom part.

3. The display apparatus of claim 2, the vertical part comprises first and second vertical parts; wherein the horizontal part comprises first and second horizontal parts; wherein
each of the first side surface parts comprises:
a first vertical part extending upward with respect to the bottom part; and
a first horizontal part extending horizontally with respect to the bottom part and connected to a lower portion of the first vertical part, and
each of the second side surface parts comprises:
a second vertical part extending upward with respect to the bottom part; and
a second horizontal part extending horizontally with respect to the bottom part and connected a lower portion of the first vertical part.

4. The display apparatus of claim 3, wherein
the first vertical part has substantially the same length as each of the long sides of the bottom part in the first direction, and
the second vertical part has substantially the same length as each of the short sides of the bottom part in the second direction.

5. The display apparatus of claim 4, wherein
a side of the first horizontal part, which is connected to a lower portion of the first vertical part, has a length greater than a length of an opposing side of the first horizontal part, and
a side of the second horizontal part, which is connected to a lower portion of the second vertical part, has a length greater than a length of an opposing side of the second horizontal part.

6. The display apparatus of claim 3, wherein the bottom part comprises:
a central area defined by a predetermined area of a central portion of the bottom part; and
an edge area surrounding the central area,
wherein the first and second horizontal parts are variably connected to the edge area based on the sizes of the display panel and the backlight unit.

7. The display apparatus of claim 6, the plurality of side surface holes comprises a plurality of first and second side surface holes; wherein
a plurality of bottom holes is defined at the edge area of the bottom part,
a plurality of first side surface holes is defined in the first horizontal part,
a plurality of second side surface holes is defined in the second horizontal part.

8. The display apparatus of claim 7, wherein the plurality of bottom holes comprises:
a plurality of first bottom holes disposed at opposing sides of the edge area of the bottom part in the second direction, respectively, wherein the plurality of first bottom holes are disposed in a matrix form having a plurality of rows in the first direction; and
a plurality of second bottom holes disposed at both sides of the edge area of the bottom part in the first direction, respectively, wherein the plurality of second bottom holes are disposed in a matrix form having a plurality of rows in the second direction.

9. The display apparatus of claim 8, wherein
the plurality of first side surface holes are disposed on first bottom holes disposed in a same row of the plurality of first bottom holes, and
the same row of the plurality first bottom holes is determined based on the sizes of the display panel and the backlight unit.

10. The display apparatus of claim 8, wherein
the plurality of second side surface holes are disposed on second bottom holes disposed in a same row of the plurality of second bottom holes, and the same row of the second bottom holes is determined based on the sizes of the display panel and the backlight unit.

11. The display apparatus of claim 9, wherein
the plurality of second side surface holes are disposed on second bottom holes disposed in a same row of the plurality of second bottom holes, and
the same row of the second bottom holes corresponds to the same row of the first bottom holes.

12. The display apparatus of claim 11, further comprising:
a connection member which connects the bottom part to the first and second horizontal parts,
wherein the connection member is inserted into the first bottom holes in the same row and the first side surface holes disposed thereon and inserted into the second bottom holes in the same row of the second side surface holes disposed thereon.

13. The display apparatus of claim 12, wherein the connection member comprises a nail or screw.

14. The display apparatus of claim 13, wherein the first and second horizontal parts are disposed on a lower portion of the bottom part to allow top surfaces of the first and second horizontal parts to contact with a bottom surface of the bottom part.

15. The display apparatus of claim 13, wherein the first and second horizontal parts are disposed on the bottom part to allow bottom surfaces of the first and second horizontal parts to contact with a top surface of the bottom part.

16. The display apparatus of claim 13, wherein
the first horizontal part is disposed on one of the top and bottom surfaces of the bottom part, and
the second horizontal part is disposed on one of the top and bottom surfaces of the bottom part.

17. The display apparatus of claim 16, further comprising:
a reinforcing member having a plate shape and disposed on the accommodation member.

18. The display apparatus of claim 17, further comprising:
a mold frame having a frame shape and contacting inner side surfaces of the first and second vertical parts.

19. The display apparatus of claim 18, wherein the mold frame has a stair shape when viewed from a cross-sectional view.

20. The display apparatus of claim 19, further comprising:
a cover member having a frame shape and disposed on the display panel and contacting outer side surfaces of the first and second vertical parts.

* * * * *